H. O. SCRANTON.
TOPPING AND STRIPPING MACHINE.
APPLICATION FILED JUNE 25, 1919.
1,343,589.
Patented June 15, 1920.
2 SHEETS—SHEET 1.
FIG_1_
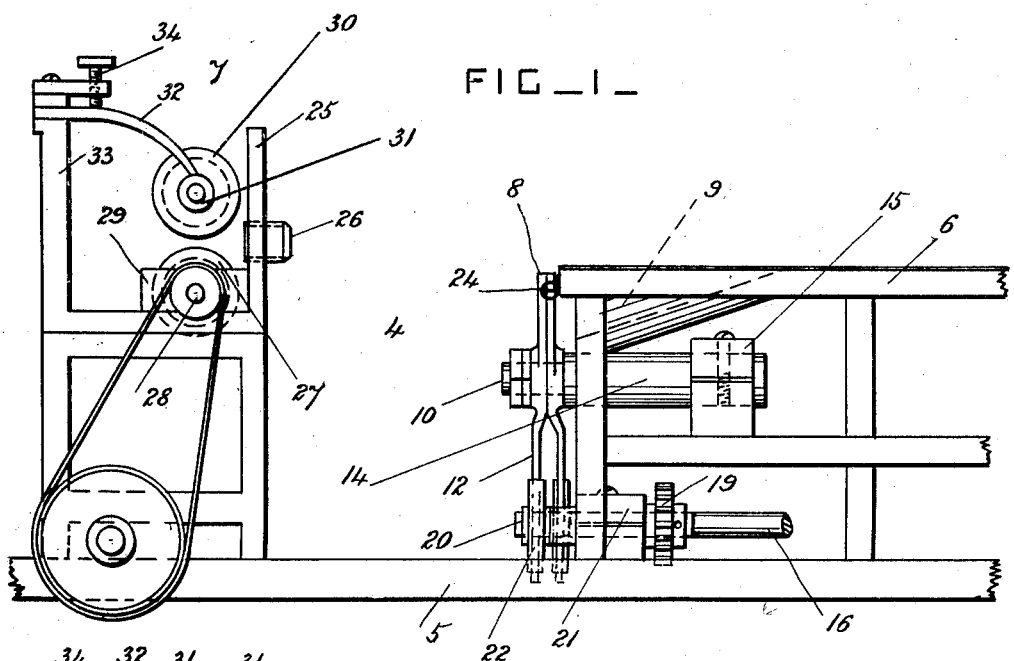
FIG_2_
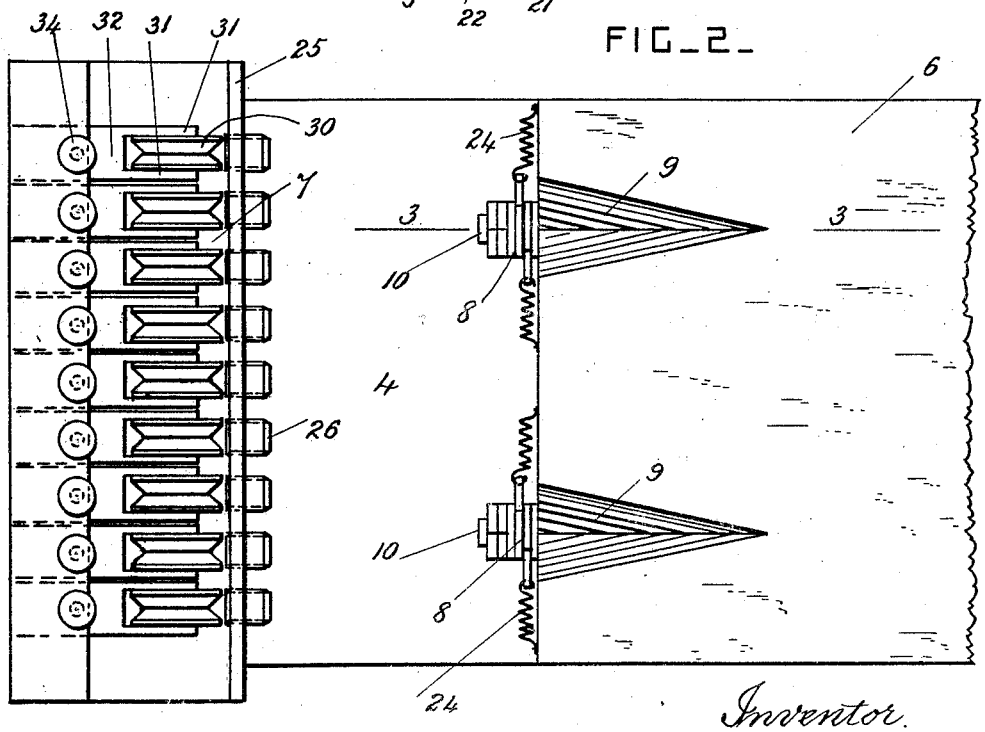
Inventor.
Henry O. Scranton
by Herbert W. Jenner
Attorney.

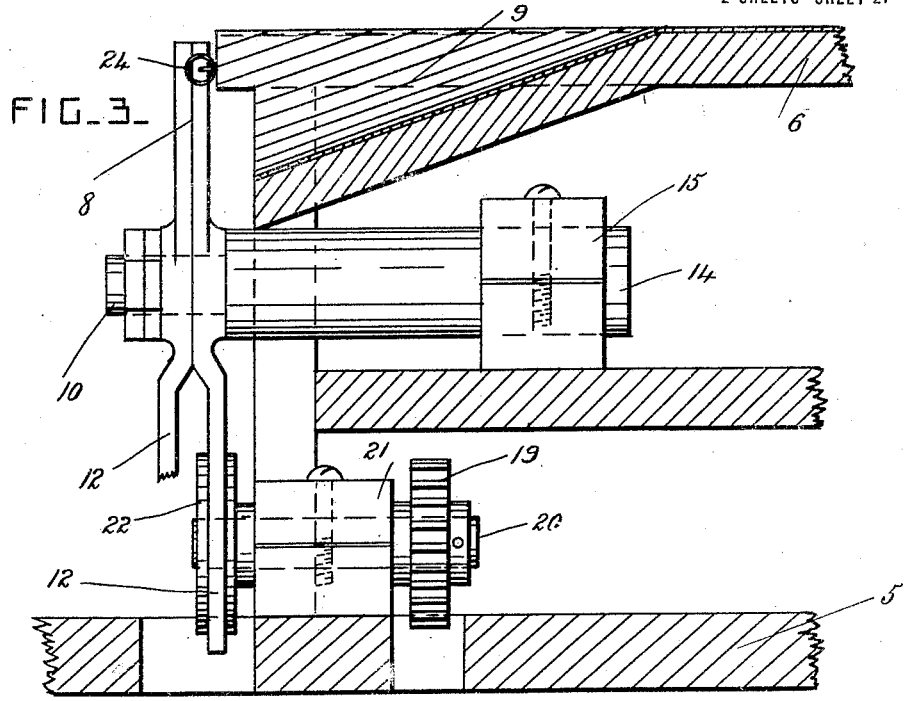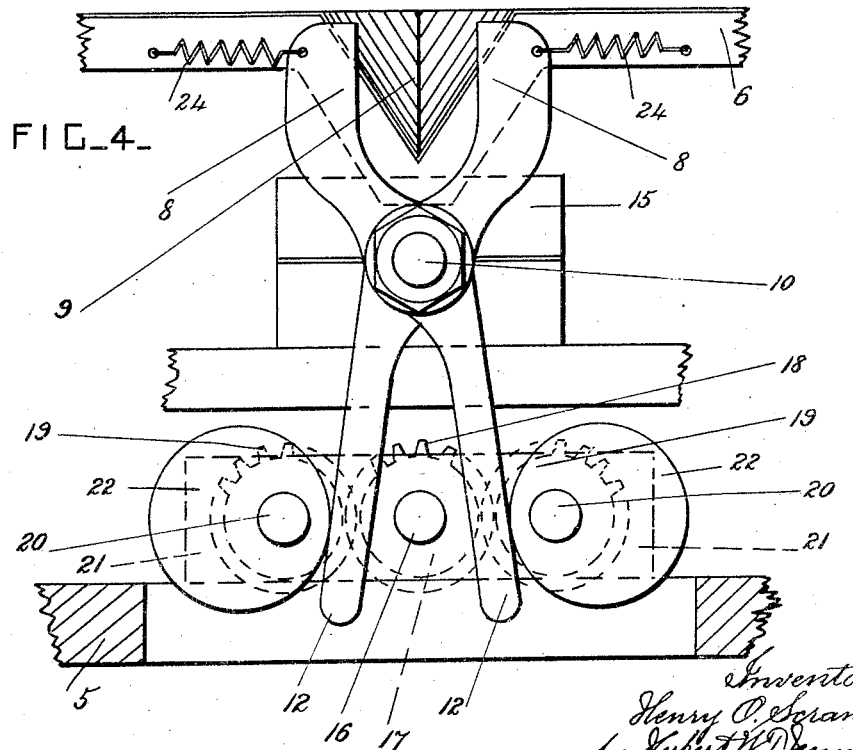

UNITED STATES PATENT OFFICE.

HENRY OSBERT SCRANTON, OF JEANERETTE, LOUISIANA.

TOPPING AND STRIPPING MACHINE.

1,343,589.   Specification of Letters Patent.   Patented June 15, 1920.

Application filed June 25, 1919. Serial No. 306,600.

*To all whom it may concern:*

Be it known that I, HENRY O. SCRANTON, a citizen of the United States, residing at Jeanerette, in the parish of Iberia and State of Louisiana, have invented certain new and useful Improvements in Topping and Stripping Machines, of which the following is a specification.

This invention relates to machines specially adapted for cutting off the tops and stripping the leaves from sugar canes, after the canes have been cut down; and it consists in the novel construction and combination of the parts hereinafter fully described and claimed.

In the drawings, Figure 1 is a side view of a topping and stripping machine constructed according to this invention. Fig. 2 is a plan view of the same. Fig. 3 is a longitudinal section through one of the topping devices, taken on the line 3—3 in Fig. 2, and drawn to a larger scale. Fig. 4 is an end view of the topping devices shown in Fig. 3.

A supporting frame 5 is provided, and is preferably mounted on a wheeled truck of any approved construction. A table 6 for receiving the cut canes is arranged at the front end portion of the frame, and the stripping devices 7 are arranged at the rear part of the frame. The topping blades 8 are arranged at the rear end of the table, and a space 4 for the top portions of the canes to fall into is arranged between the topping blades and the stripping devices. Two pairs of topping blades are preferably provided, so that the machine may be operated by two men who stand one on each side of the table. As the two pairs of blades are alike, the description will be confined to one pair.

A V-shaped groove 9 is formed in the rear part of the top of the table, with its wide end at the rear edge of the table. This V-shaped groove is V-shaped in plan view, and it is also V-shaped in cross-section, but the form of its cross-section may be varied, the object of the groove being to provide a guide channel having a rearwardly and downwardly inclined bottom and rearwardly diverging sides, which will guide the upper portions of the canes so that their top portions may project between the topping blades, when the upper end portions of the canes are sprung downwardly by hand in the guide channel or groove below the level of the table top. The blades 8 are mounted on a pivot 10 arranged longitudinally of and under the groove 9, and they have crossed shanks 12 so that they work like a pair of shears.

The pivot 10 is formed on the end of a spindle 14, the front end portion of which is clamped in a bearing box 15 secured to the table frame. The spindle can be adjusted longitudinally in the box 15 to set the blades in any desired position. The cutting edges of the blades work crosswise of the larger end of the V-shaped groove, below the level of the top of the table.

A longitudinal driving shaft 16 is journaled in bearings 17 on the table frame, and is revolved by any approved means or motor. A toothed wheel 18 is secured on the shaft 16, and gears into two toothed wheels 19 secured on cam shafts 20. The shafts 20 are journaled in bearings 21 secured to the table frame, and they are arranged one on each side of the driving shaft 16. Cams 22 are also secured on the cam shafts 20, and are arranged to bear against the shanks of the cutting blades so that the blades are moved toward each other to cut off the tops of the canes. Springs 24 are secured to the blades and to the table frame, for moving the blades in the reverse direction.

The stripping mechanism is provided with a supporting plate 25 secured to the frame 5, and stripper blades or cutters 26 are secured to this plate. The stripper blades or cutters are substantially tubular, and a series of them is provided, the cutters being arranged in a row, and at any suitable height with relation to the top of the table.

Rollers 27 are arranged below and behind the cutters 26, and are secured on a shaft 28, journaled in bearings 29 on the frame and revolved by any suitable means or motor.

Rollers 30 are mounted to revolve over the rollers 27, and all the rollers are preferably grooved so that they will grip the canes tightly. The upper rollers 30 are journaled in bearings 31 on the free end portions of springs 32 which are secured to a support 33. Screws 34 are provided for adjusting the pressure of the springs. Each cutter 26 has a separate pair of rollers, and they are arranged to grip the end portion of the cane which is thrust through the tubular cutter, and pull the whole cane longitudinally through it.

Each man grips the canes one after another, and slides the top portion of each cane down the V-shaped groove of the table next in front of him, and between the topping blades 8. The blades cut the top off the cane, and the man then thrusts the cane through one of the stripping cutters into engagement with the pair of rollers behind it. The man is then free to attend to topping more canes, as the canes are dragged off the table and through the strippers without further attention. A number of canes can be stripped simultaneously, a separate cane being pushed into whichever stripper is ready to receive it, and one topping device being sufficient to supply a number of stripping devices.

The strippers remove all the leaves from the canes, and the leaves are discharged into the space between the stripping mechanism and the topping mechanism, together with the tops.

What I claim is:

1. The combination, with a table having a substantially flat top over which the canes are slid longitudinally and rearwardly, said top being provided with a longitudinal open guide channel having an unobstructed open end at the rear edge of the table top and adapted to have the canes sprung downwardly into it, of a topping device for severing the canes arranged in line with the lower rear end of the said channel.

2. The combination, with a table having a substantially flat top over which the canes are slid longitudinally and rearwardly, said top being provided with a longitudinal open guide channel V-shaped in plan view and having a rearwardly and downwardly inclined bottom and an unobstructed open end arranged at the rear edge of the table top and adapted to have the canes sprung downwardly into it, of a topping device for severing the canes arranged in line with the lower rear end of the said channel.

3. The combination, with a table having a substantially flat top over which the canes are slid longitudinally and rearwardly, said top being provided with a longitudinal open guide channel having an inclined bottom and an unobstructed open end at the rear edge of the table top and adapted to have the canes sprung downwardly into it, of a topping device for severing the canes arranged in line with the lower rear end of the said channel and working wholly below the level of the top of the table.

4. The combination, with a table having a substantially flat top over which the canes are slid longitudinally and rearwardly, said top being provided with a longitudinal open guide channel having an unobstructed open end at the rear edge of the table top and adapted to have the canes sprung downwardly into it, of a pair of cutting blades having crossed and pivoted shanks, said blades being arranged wholly below the level of the table top in line with the lower rear end of the said channel, and means for oscillating the blades to sever the canes.

5. The combination, with a table having a substantially flat top over which the canes are slid longitudinally and rearwardly, said top being provided with a longitudinal open guide channel having an unobstructed open end at the rear edge of the table top and adapted to have the canes sprung downwardly into it, of a longitudinally adjustable spindle secured below the table top, a pair of cutting blades pivoted on the rear end portion of the said spindle and arranged below the level of the table top in line with the lower rear end of the said channel, and means for oscillating the blades to sever the canes.

6. The combination, with a table having a substantially flat top over which the canes are slid longitudinally and rearwardly, said top being provided with a longitudinal open guide channel having an unobstructed open end at the rear edge of the table top and adapted to have the canes sprung downwardly into it, of a topping device for severing the canes arranged in line with the lower rear end of the said channel, and a cane stripping device arranged at a predetermined distance beyond the rear end of the table and at a suitable elevation with respect to its top and provided with means for dragging the canes longitudinally over the table top after their top portions have been cut off.

In testimony whereof I have affixed my signature.

HENRY OSBERT SCRANTON.